US007653961B2

(12) United States Patent
Probasco

(10) Patent No.: US 7,653,961 B2
(45) Date of Patent: Feb. 2, 2010

(54) GLASS CLEANING DEVICE

(76) Inventor: Timothy Paul Probasco, 2965 Caldwell La., Geneva, IL (US) 60134

( * ) Notice: Subject to any disclaimer, the term of this patent is extended or adjusted under 35 U.S.C. 154(b) by 26 days.

(21) Appl. No.: 11/838,031

(22) Filed: Aug. 13, 2007

(65) Prior Publication Data
US 2008/0034521 A1 Feb. 14, 2008

Related U.S. Application Data

(60) Provisional application No. 60/822,283, filed on Aug. 14, 2006.

(51) Int. Cl.
A47L 1/06 (2006.01)
(52) U.S. Cl. ............ 15/220.1; 15/143.1; 15/210.1
(58) Field of Classification Search ........ 15/104.94, 15/220.1, 227, 143.1, 209.1, 210.1, 229.11; 401/8
See application file for complete search history.

(56) References Cited

U.S. PATENT DOCUMENTS

| | | | | |
|---|---|---|---|---|
| 1,783,788 A * | 12/1930 | Hatchett, Sr. | ........... | 15/160 |
| 1,994,425 A * | 3/1935 | Weller | ........... | 15/104.94 |
| 3,460,182 A * | 8/1969 | Grande, Jr. | ........... | 15/227 |
| 4,602,650 A * | 7/1986 | Pipkin | ........... | 132/317 |
| 4,665,901 A * | 5/1987 | Spector | ........... | 601/139 |
| 4,778,301 A | 10/1988 | Sicotte | | |
| 4,924,608 A * | 5/1990 | Mogonye | ........... | 36/62 |
| 5,569,521 A * | 10/1996 | Francoeur et al. | ........... | 428/171 |
| 5,749,119 A | 5/1998 | Isaac | | |
| 5,815,876 A * | 10/1998 | Overseth | ........... | 15/179 |
| 5,862,565 A | 1/1999 | Lundstedt | | |
| 6,017,351 A * | 1/2000 | Street | ........... | 606/131 |
| 6,315,478 B1 | 11/2001 | Atkins | | |
| 6,481,443 B1* | 11/2002 | Moore-Johnson et al. | ..... | 132/73 |
| 6,543,951 B1* | 4/2003 | Bauman | ........... | 401/8 |
| 6,973,695 B1 | 12/2005 | Nesler | | |

* cited by examiner

Primary Examiner—Randall Chin
(74) Attorney, Agent, or Firm—Banner & Witcoff, Ltd.

(57) ABSTRACT

A device for cleaning vehicle windshields assists in placing the user's hand in a favorable position to more easily clean the inside of a windshield with a wiping motion. The device includes a base having a padded member attached to its bottom side. A cleaning member is removably attached to the top side of the base. The device has straps that encircle the base and the padded member. The user's hand is placed through the straps such that the top side of the user's hand is against the bottom of the padded member. The user positions their hand to place the top side of the cleaning member against the windshield moving their hand in a wiping motion.

11 Claims, 6 Drawing Sheets

GLASS CLEANING DEVICE

RELATED APPLICATION

The present application claims the benefit of and is a continuation-in-part of U.S. provisional application No. 60/822,283 filed Aug. 14, 2006, which application is expressly incorporated herein by reference.

TECHNICAL FIELD

The present invention generally relates to a device for cleaning vehicle windows and surfaces and in particular, a device for cleaning an inside surface of a vehicle windshield.

BACKGROUND AND PRIOR ART

Window cleaning devices are known in the art. Devices typically have a cloth-type surface or sponge for cleaning the window surface. While window cleaning devices according to the prior art provide a number of advantageous features, they nevertheless have certain limitations. For example, in certain environments, a window may have an angular configuration making cleaning more difficult. Vehicle windshields are one type of window wherein the angle of the windshield makes it difficult for one to clean the inside surface of the windshield based on the required hand position to wipe the window. In order to accommodate the angular surface of the inside of a windshield, the required hand position is awkward for providing a wiping motion. Other surfaces having an angular configuration pose similar problems.

The present invention seeks to overcome certain of these limitations and other drawbacks of the prior art, and to provide new features not heretofore available.

SUMMARY OF THE INVENTION

The present invention relates to a cleaning device such as for the inside surface of a vehicle windshield. The cleaning device can be used to clean angled surfaces in vehicles, such as windshields and dashboards, or any other angular surface. The device can also be utilized to clean other glass and non-angular surfaces. The cleaning device is designed to attach to the user's hand in a manner which permits the cleaning device to be positioned on the backside of the user's hand, i.e., the side of the hand opposite the user's palm. The positioning of the device in this manner enables the user to clean the surface by applying pressure to the cleaning device with the back of the user's hand when in contact with the windshield. The use of the cleaning device eliminates the need for the user to apply pressure to the cleaning device with the palm side of the user's hand, thus facilitating a wiping motion.

The cleaning device is constructed from a base that may have a cushion on one side for the comfort of the user's hand. The cushion may be tapered from the edges such that the thickness of the device is thinner around all or part of the periphery to permit the cleaning device to more easily fit into crevices and other small areas.

A removable cleaning pad which may be re-usable or disposable, is attached to the base such that the cleaning pad is easily replaced when the pad is dirty or worn. At least one side of the cleaning pad is made of a material that attaches to a hook closure means used in hook and loop closures such as Velcro. The cleaning pad can be attached to the base via hooks that are on the top side of the base. The hooks can be part of the traditional Velcro hooks, or may be molded into the top side of the base.

Other features and advantages of the invention will be apparent from the following specification taken in conjunction with the following drawings.

DETAILED DESCRIPTION

Figure 1:
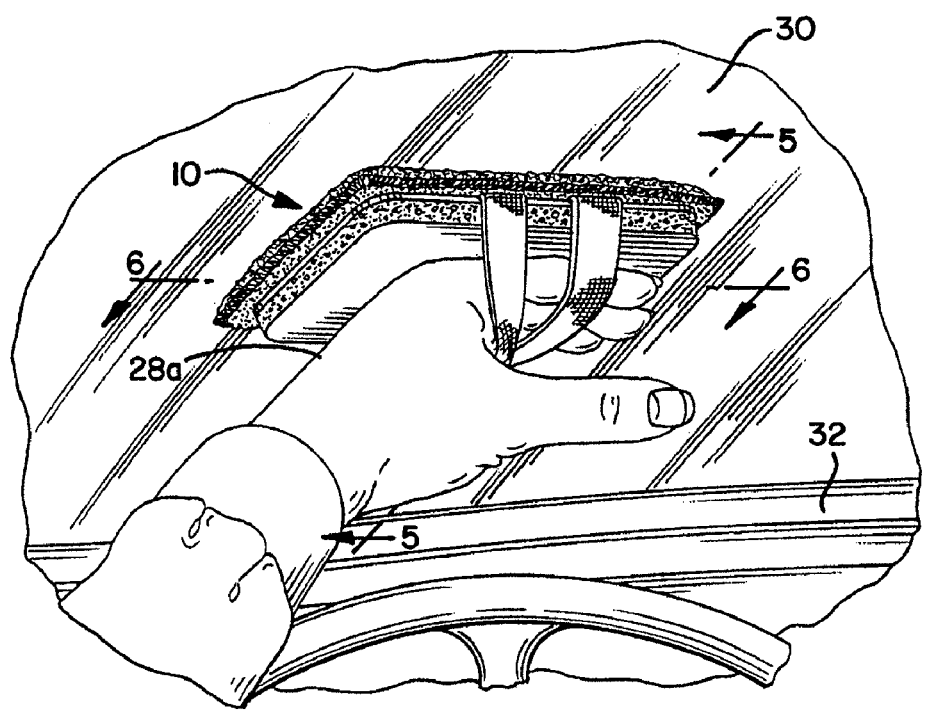
FIG. 1 is a partial perspective view of a vehicle interior showing a cleaning device of the present invention in use by the user.
Figure 5:
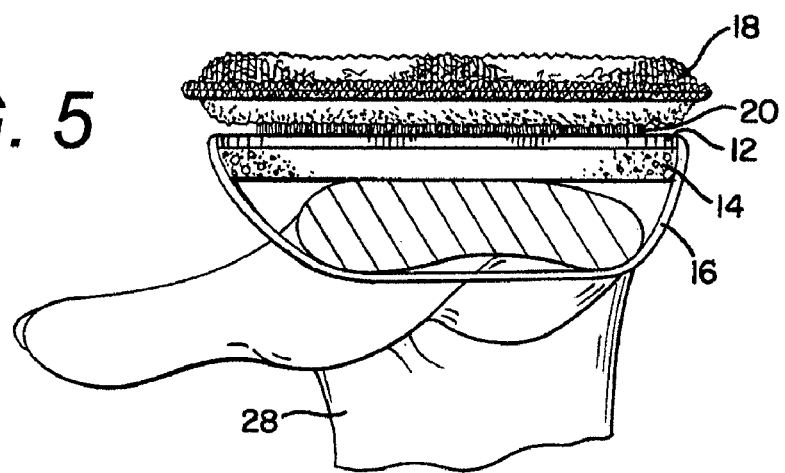
FIG. 5 is a partial cross-sectional view along lines 5-5 of FIG. 1.

While this invention is susceptible of embodiments in many different forms, exemplary embodiments of the invention are shown in the drawings and will herein be described in detail with the understanding that the present disclosure is to be considered as an exemplification of the principles of the invention and is not intended to limit the broad aspect of the invention to the embodiments illustrated.

Figure 2:
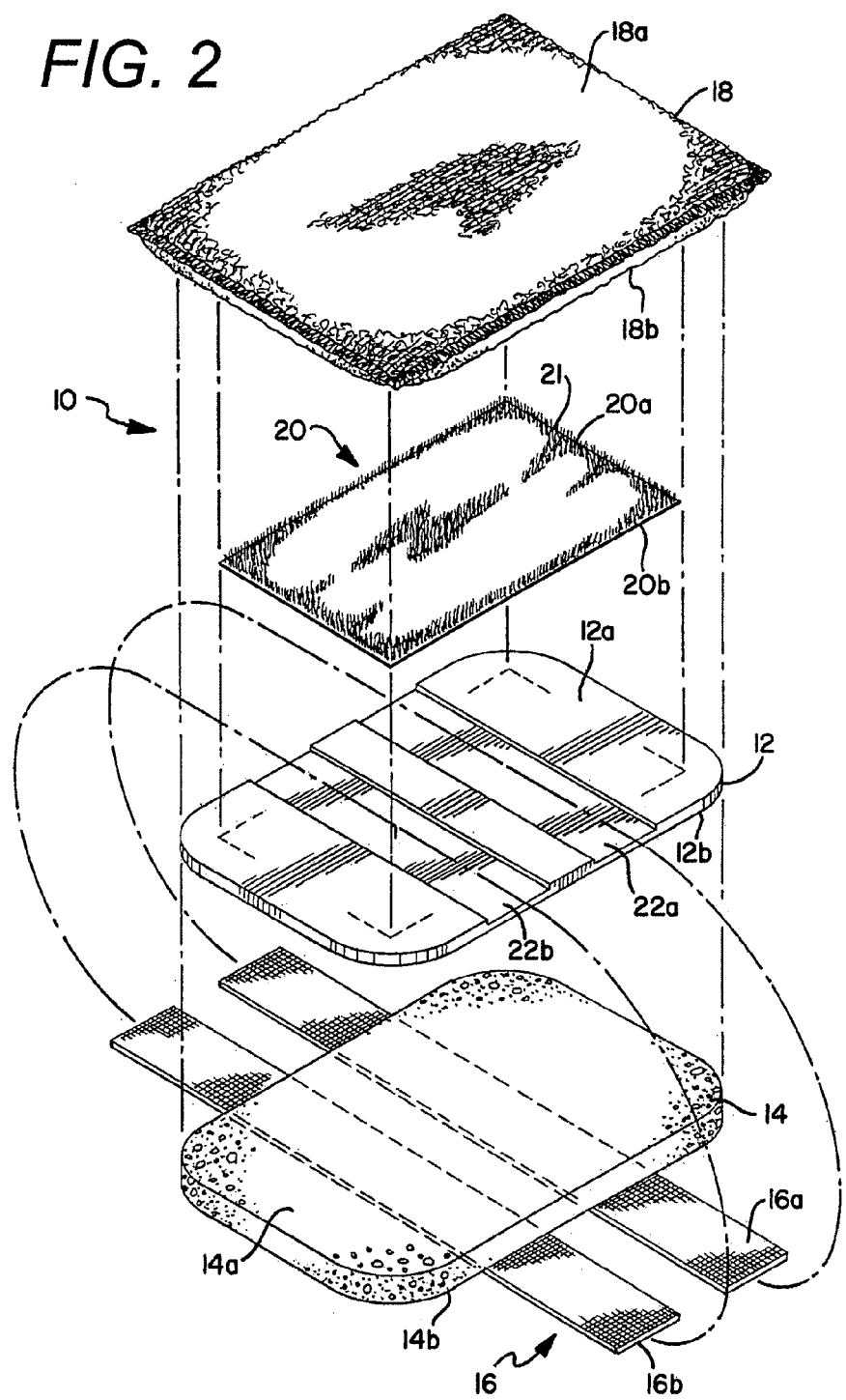
FIG. 2 is an exploded perspective view of one embodiment of the cleaning device of the present invention.
Figure 3:
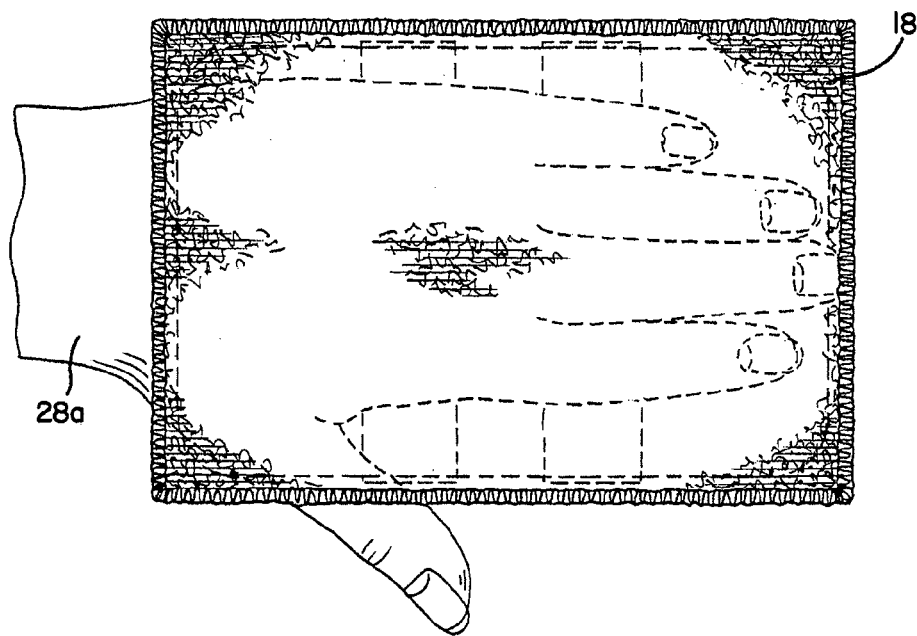
FIG. 3 is a top plan view of one embodiment of the cleaning device on the user's hand.
Figure 4:
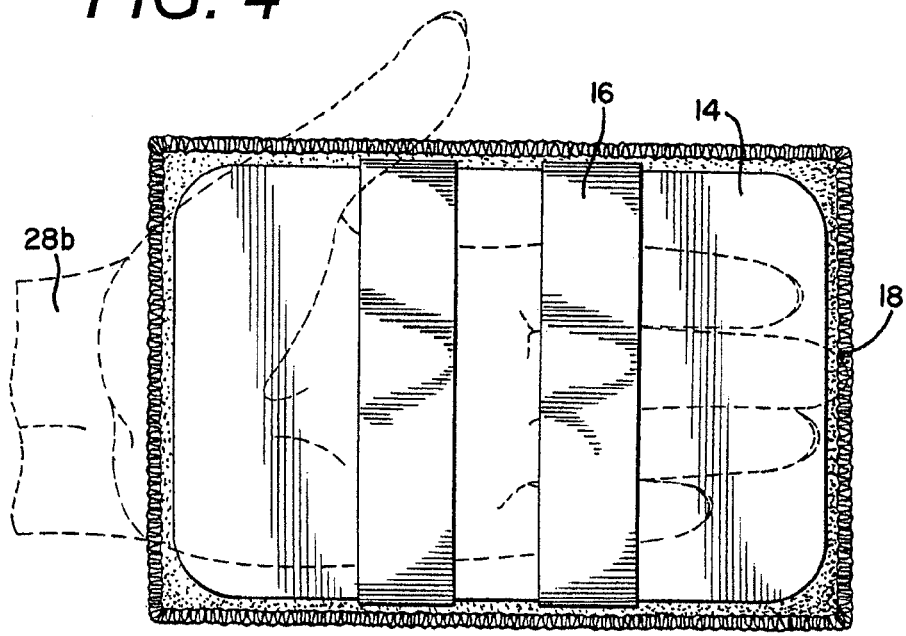
FIG. 4 is a bottom plan view of one embodiment of the cleaning device on the user's hand.

FIGS. 1-6 disclose a cleaning device of the present invention generally designated with the reference numeral 10. As shown in FIG. 2, the cleaning device 10 generally includes a base 12, a padded member 14, a strap assembly 16, a cleaning member 18, and a fastener 20.

As further shown in FIG. 2, the base 12 has a first side or top side 12a, and a second side or a bottom side 12b, and is comprised of a rigid material such as high density polyethylene or plastic. Another suitable material that may be utilized for the base 12 is Plexiglas synthetic resin. In one embodiment, the base 12 is generally rectangular in shape and has rounded corners. However, the base 12 may have non-rounded corners and/or a non-rectangular shape, and may include a protrusion that is smaller than the width or length of the base. The width of the base 12 may be at least as wide as an average hand of a user. The length of the base 12 may be the same as the width of the base 12 or longer. The first side 12a of base 12 has channels 22a, 22b. If there is more than one channel, the channels 22a, 22b may run parallel to each other. In the embodiment shown, the channels 22a, 22b, run perpendicular to the direction of the user's hand 28 as described in greater detail below. It is understood that the base 12 could have a single channel.

The padded member 14 is made of a cushioned material such as foam or neoprene. The padded member 14 has a first side 14a and a second side 14b. The length, width and shape of the padded member 14 may be generally similar to that of the base 12. The thickness of the padded member 14 is preferably of a dimension to provide cushioning for the user's hand 28 when in use.

The strap assembly 16 consists of one or more straps 16a, 16b, that are adjustable in length. The straps 16a, 16b, are of a length sufficient to extend across the width of the base 12, up the side of the base 12 and extend into the channels 22a, 22b.

The straps 16a, 16b, may be of such length so as to encircle the width of the base 12 or more. Preferably, the straps 16a, 16b, are made of resiliently flexible material such as elastic.

The cleaning member 18 has a top side or first side 18a, and a bottom side or second side 18b which may be made of different materials or different textures. Preferably, the first and second sides 18a, 18b of the cleaning member 18 are made of a soft material such as cloth, micro-fiber material, paper, or other fibrous, natural or synthetic materials, that are washable and reusable, or disposable. The first side 18a and the second side 18b of the cleaning member 18 may enclose a sponge or foam or another pliable material. In a preferred embodiment, at least the second side 18b of the cleaning member 18 is constructed of pile or loops 19 (FIG. 6) for receiving hooks 21 commonly used for fastening such as in Velcro hook and loop material. In the embodiment shown in FIGS. 1-6, the cleaning member 18 is approximately the same length and width of the base 12 and the padded member 14. The cleaning member 18 may also have a larger length or width than either the base 12 or the padded member 14.

As further shown in FIG. 2, the fastener 20 has a top side or first side 20a, and a bottom side or second side 20b, said first side 20a, having rigid extensions such as hooks 21 for receiving and engaging the loops 19 contained on the second side 18b of the cleaning member 18. The second side 20b of the fastener 20 is a relatively flat surface. The fastener 20 is the same size as or smaller than the dimensions of the base 12 and may be of generally rectangular shape or of various other shapes.

Figure 6:
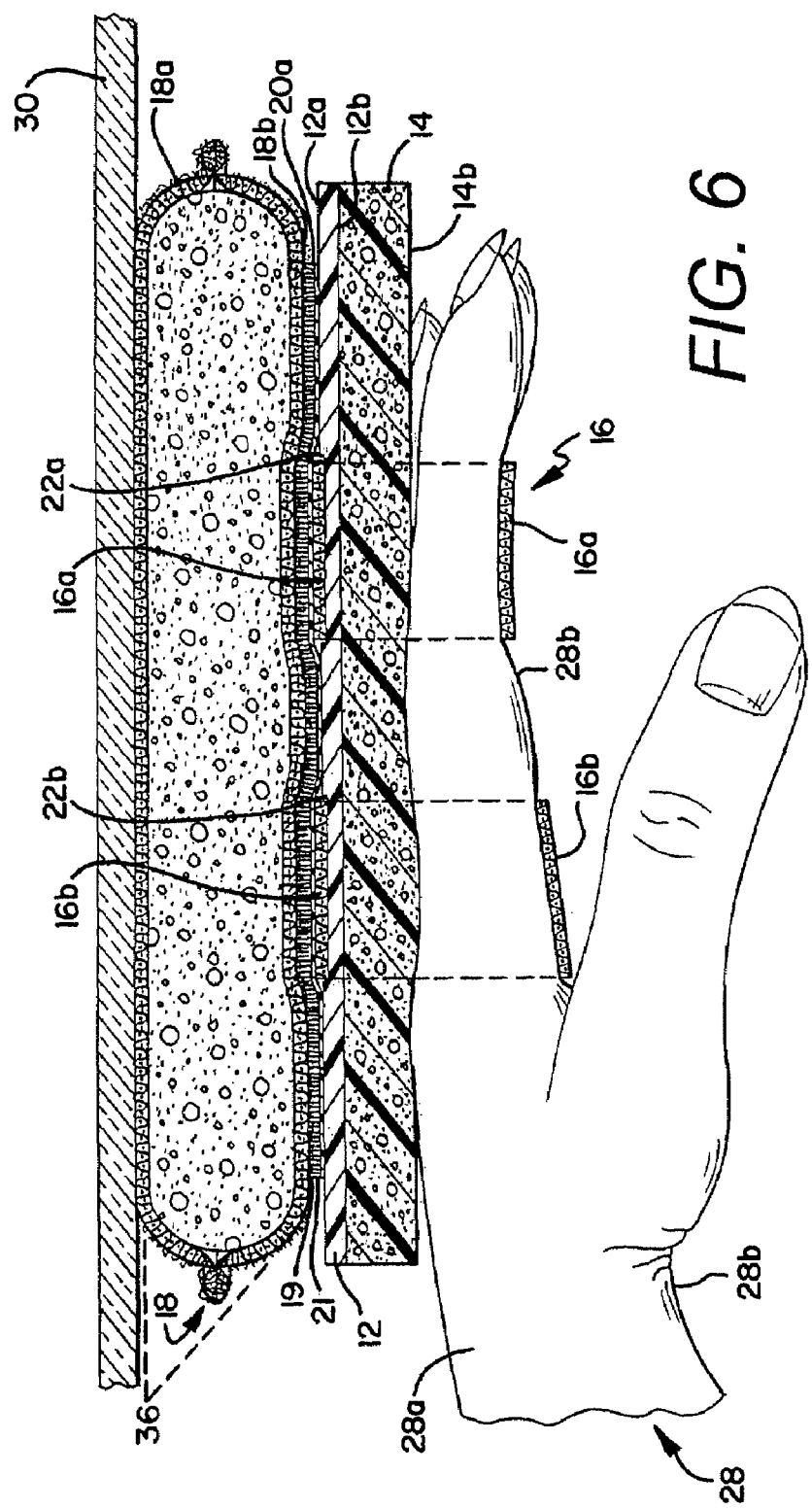
FIG. 6 is a cross-sectional view along lines 6-6 of FIG. 1.

As shown in FIG. 6, the padded member 14 is fixedly attached to the second side 12b of the base 12. This may be accomplished by use of various adhesives or grommets or other means of fixed attachment. The straps 16a, 16b extend across the second side 14b of the padded member 14 and the first side 12a of the base 12 such that the straps 16a, 16b encircle the padded member 14 and the base 12. Each of the one or more channels 22a, 22b located on the first side 12a of the base 12 receives the respective straps 16a, 16b.

As shown in FIGS. 2 and 6, the second side 20b of the fastener 20 is fixedly attached to the first side 12a of the base 12 thereby covering the straps 16a, 16b as situated in the channels 22a, 22b. As discussed, the first side 20a of the fastener 20 has hooks 21 or other rigid extensions which engage the loops 19 in the second side 18b of the cleaning member 18. Thus in one exemplary embodiment of the invention, the fastener comprises a hook and loop fastener having cooperating components wherein the loops 19 of the cleaning member 18 cooperate with the hooks 21 on the fastener 20. This allows the cleaning member 18 to be removably attached to the base 14. It is understood that the cleaning device 10 can have multiple cleaning members 18 having different surface characteristics for different types of cleaning. It is further understood that the cleaning member 18 can be permanently attached to the base 12. In certain instances, the fastener 20 may take other forms including adhesives, double-sided tapes or other fastening elements.

The cleaning device 10, may be used to clean surfaces, and particularly angled surfaces such as windshields 30. The hand position required for providing a wiping motion to clean the inside of a windshield can be awkward. Use of this cleaning device 10 in the manner describe herein, assists in placing the user's hand 28 in a favorable position to more easily clean the inside of a windshield 30 with a wiping motion.

To use the cleaning device 10, the user selects a cleaning member 18 and applies the second side 18b of cleaning member 18 to the first side 20a of the fastener 20. When this is completed correctly, the first side 20a of the fastener 20, as well as the first side 12a of the base 12, are covered by the cleaning member 18.

As shown in FIGS. 1, 3-6, the top side or first side 28a of the user's hand 28 (i.e., the side of the hand or fingers opposite the user's palm) which may include only the finger portion of the user's hand 28, is placed through the straps 16a, 16b such that the first side of the user's hand 28a is against the second side 14b of the padded member 14 and the straps 16a, 16b encircle a bottom side or second side 28b of the user's hand 28. In one preferred embodiment, the straps 16a, 16b are elastic or some other resilient flexible material, so as to adapt to the size of the user's hand 28 or another limb, and to secure the cleaning device 10 to the user's hand 28 or another limb. If the straps 16a, 16b are not constructed of elastic or resiliently flexible material, the user may adjust the straps such that the cleaning device 10 fits snugly against the user's hand 28.

While the padded member 14 is not a required part of the cleaning device 10, it provides cushioning for the user's hand 28 such that the user's hand 28 is not directly in contact with the rigidity of the base 12 providing additional comfort to the user's hand 28 during use of the cleaning device 10.

Cleaners, including water, may be applied to the first side 18a of the cleaning member 18, or to the windshield 30 or other surface. Alternatively, the cleaning member 18 can be used dry, without the application of cleaners. To begin cleaning the surface, the user places the first side 18a of the cleaning member 18 against the windshield 30 as shown in FIGS. 1 and 6, and moves the hand with the cleaning device 10 in a wiping motion. Pressure can be applied to the cleaning member 18 easily by the user's hand.

To facilitate cleaning in small areas between the windshield 30 and dashboard 32, or in crevices or other small places, the base 12 and cleaning member 18, or just the cleaning member 18, may contain a extension 36 (shown schematically in FIG. 6) enabling the cleaning device 10 to be used to clean such areas.

When the windshield 30 is clean, or when a new cleaning member 18 is required, the user detaches the cleaning member 18 from the fastener 20 or the base 12 and replaces the used cleaning member 18 with a new cleaning member. Depending on the construction of the cleaning member 18, or the preference of the user, the used cleaning member 18 may be washed and re-used, or disposed of in the appropriate manner.

Figure 7:
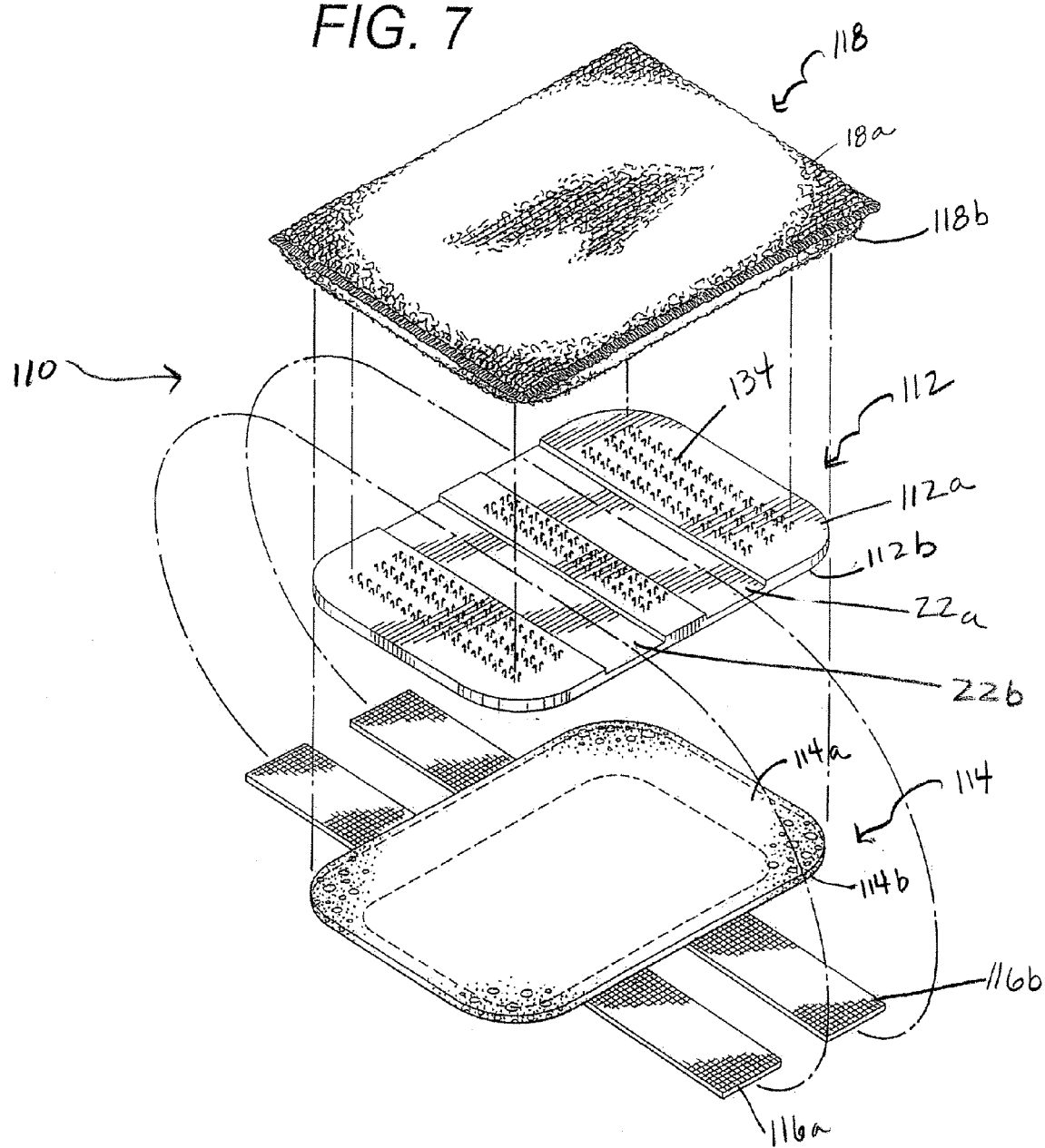
FIG. 7 is an exploded perspective view of an alternative embodiment of the cleaning device of the present invention.
Figure 8:
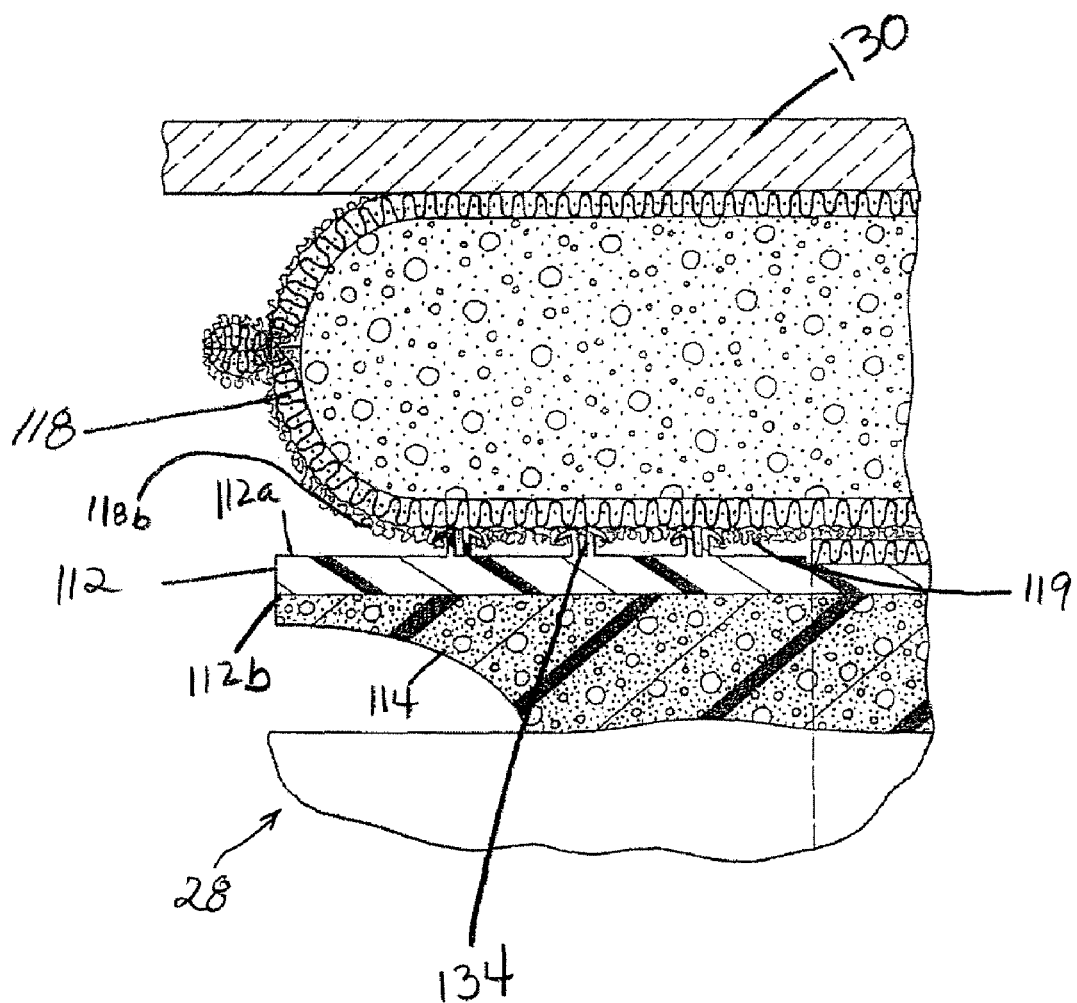
FIG. 8 is a partial cross-sectional view of another alternative embodiment of the cleaning device of the present invention.

FIGS. 7 and 8 disclose a cleaning device 110 having an alternative fastener arrangement. Similar structures to those discussed above will be referred to with similar reference numerals in a 100 series. The top side or first side 112a of the base 112 has a plurality of protrusions 134 integrally molded with the base 112. These protrusions 134 may be hook-shaped and be molded into the first side 112a of base 112. The protrusions 134 engage the loops 119 (FIG. 8) in the second side 18b of the cleaning member 118. In the cleaning device 110 shown in FIGS. 7 and 8, the second side of the base 112b is attached directly to the first side 14a of the padded member 114. Thus, the arrangement of the cleaning device 112 shown in FIGS. 7 and 8 eliminates the need for the fastener member 20 shown in FIGS. 1, 2, 5, and 6.

FIGS. 7 and 8 also disclose a cleaning device 110 having an alternative configuration for the padded member 114. In the cleaning device 110, the periphery of the padded member 114 is tapered such that the outer edges of the padded member 114 are of a thickness that is less than the thickness of the inner portion of the padded member 114. The reduced thickness of the padded member 114 around the outer edges renders the overall thickness of the cleaning device 110 thinner and enables the cleaning device 110 to more easily fit into crevices and other confined areas. While the thickness of the padded member 114 may vary, in one embodiment, where the base 112 is about 15 cm in length, the padded member 114, tapers from a thickness of about 10 mm at 6.25 cm from the center to about 2 mm at 7.5 cm from the center, such that the first side 114a of the padded member 114 is about 15 cm in length and the second side 114b is about 12.5 cm in length.

As can be appreciated from the figures and description herein, the cleaning device 10, 110 for cleaning vehicle windshields assists in placing the user's hand in a favorable position to more easily clean the inside of a windshield or other angled surface with a wiping motion. A user can more easily apply pressure to the cleaning member and surface to be cleaned with the device mounted as shown in, for example, FIG. 1. In one exemplary embodiment, the cleaning device 10,110 can be used to more easily clean the inside surface of a vehicle windshield. As discussed, it is further understood that other window surfaces and other vehicle surfaces such as angled dashboard or panel surfaces can be more easily cleaned with the cleaning device 10,110.

The cleaning device may be embodied in other forms. For example, a handle extending from the cleaning device such as from the base, may be included. In this fashion, the user can grasp the handle to hold the cleaning device for cleaning a surface.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention and the scope of protection is only limited by the scope of the accompanying claims.

What is claimed is:

1. A device for cleaning an inside surface of a vehicle windshield, the device comprising:
    a base having a first side and a second side;
    a plurality of channels positioned on the first side of said base;
    a cleaning member removably attached to the first side of the base;
    a padded member connected to the second side of the base;
    a plurality of straps positioned around the padded member and base wherein a respective strap is positioned in a respective channel;
    wherein back a user's hand is configured to be received between the straps and the padded member.

2. The cleaning device of claim 1 wherein said straps are adjustable.

3. The cleaning device of claim 1 further comprising a fastener member operably connected between the first side of the base and the cleaning member.

4. The cleaning device of claim 3 wherein the fastener member has hooks.

5. The cleaning device of claim 4 wherein the cleaning member has loops that cooperate with the hooks to connect the cleaning member to the base.

6. The cleaning device of claim 1 wherein the first side of the base has protrusions.

7. The cleaning device of claim 6 wherein the protrusions are molded into the first side of the base.

8. The cleaning device of claim 6 wherein the cleaning member has loops that cooperate with the protrusions to connect the cleaning member to the base.

9. A device for cleaning an inside surface of a vehicle windshield, the device comprising:
    a base having a first side and a second side, the base having a plurality of channels on the first side;
    a padded member connected to the second side of the base;
    a plurality of straps positioned around the padded member and base wherein a respective strap is positioned in a respective channel;
    a fastener member operably associated with the first side of the base, the fastener member having at least one hook;
    a cleaning member having a loop fastener, the loop fastener being removably attached to the at least one hook,
    wherein a back of a user's hand is received between the straps and the padded member and wherein the device is configured to clean the inside surface of the vehicle windshield.

10. The cleaning device of claim 9 wherein the at least one hook are protrusions molded into the first side of the base.

11. The cleaning device of claim 9 wherein the fastener member is a separate member connected to the base.

* * * * *